May 25, 1943.　　W. L. KAUFFMAN, 2D　　2,320,325
INDEXING DEVICE FOR WRINGERS
Filed March 24, 1941　　3 Sheets-Sheet 2
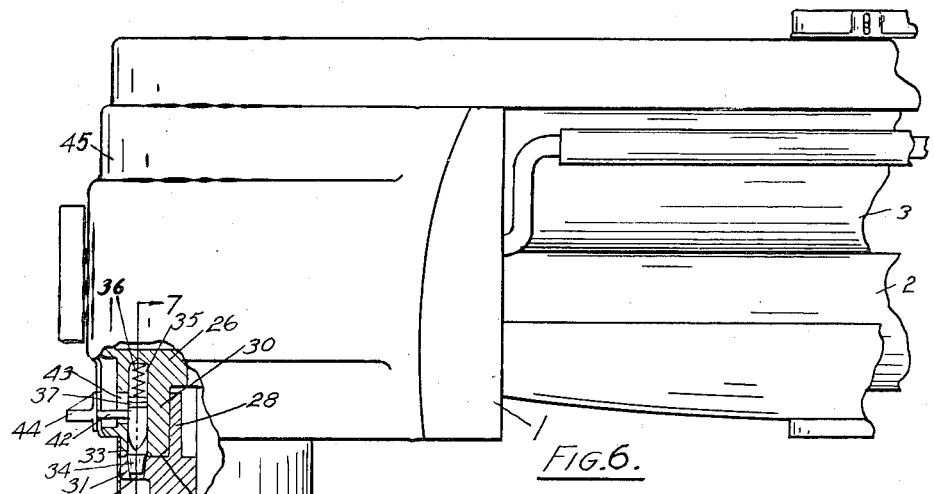
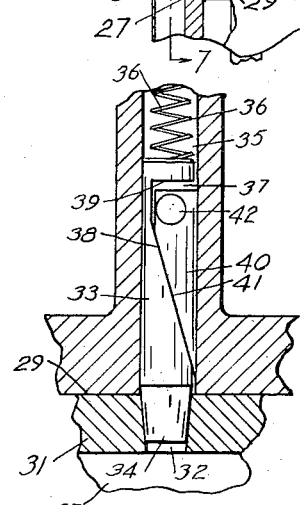
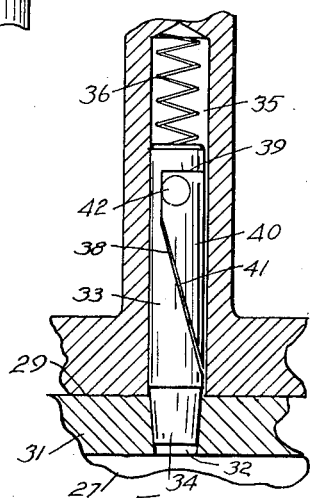
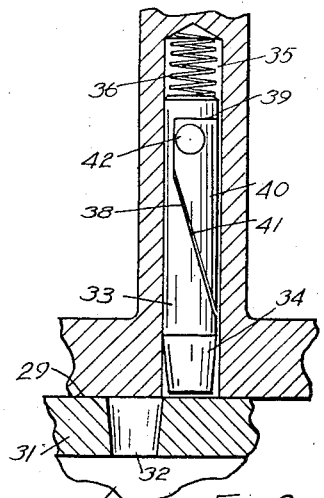
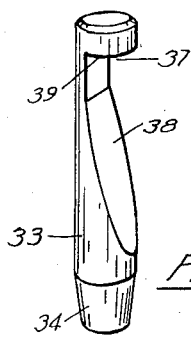
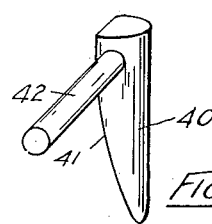
INVENTOR
ATTORNEYS

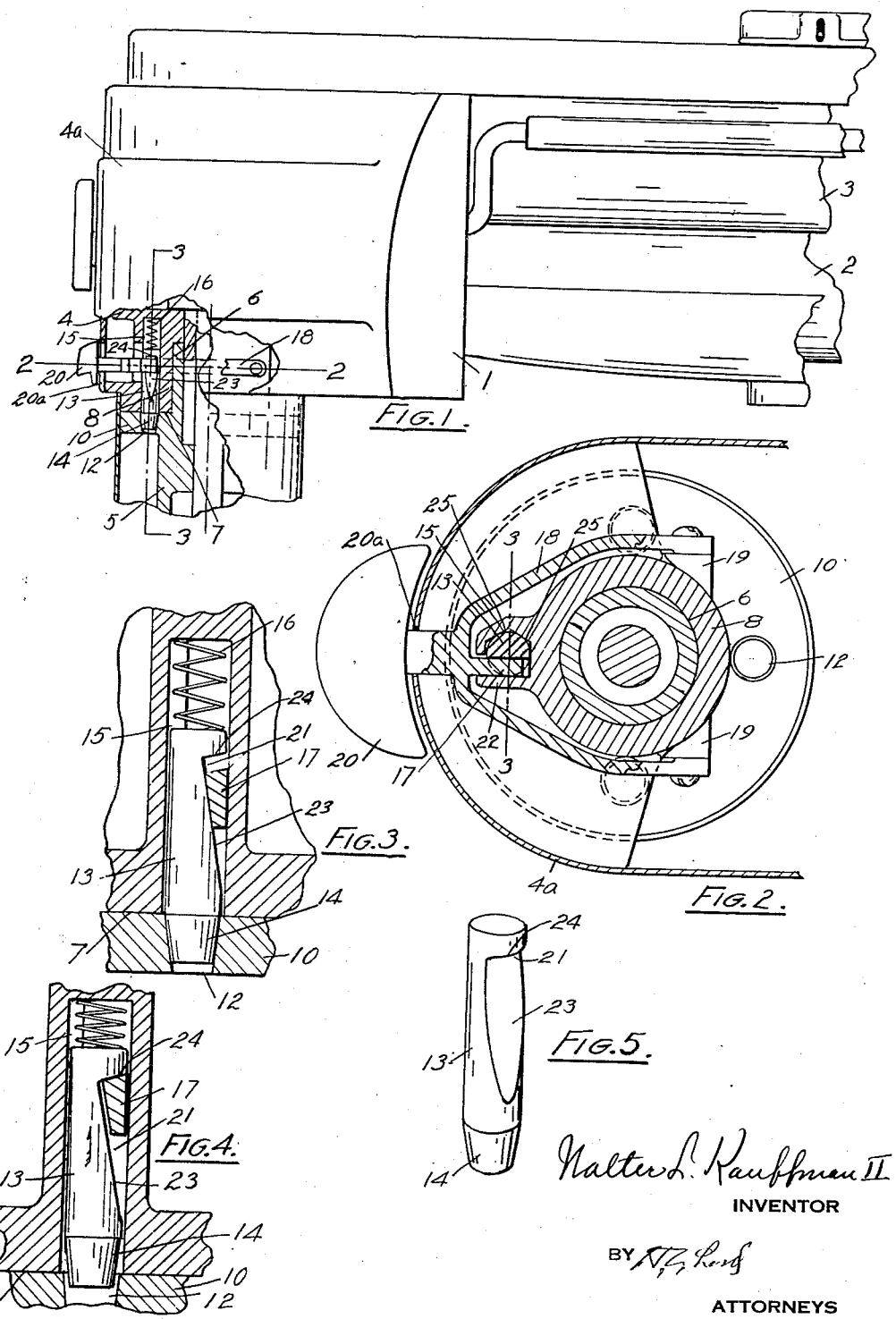

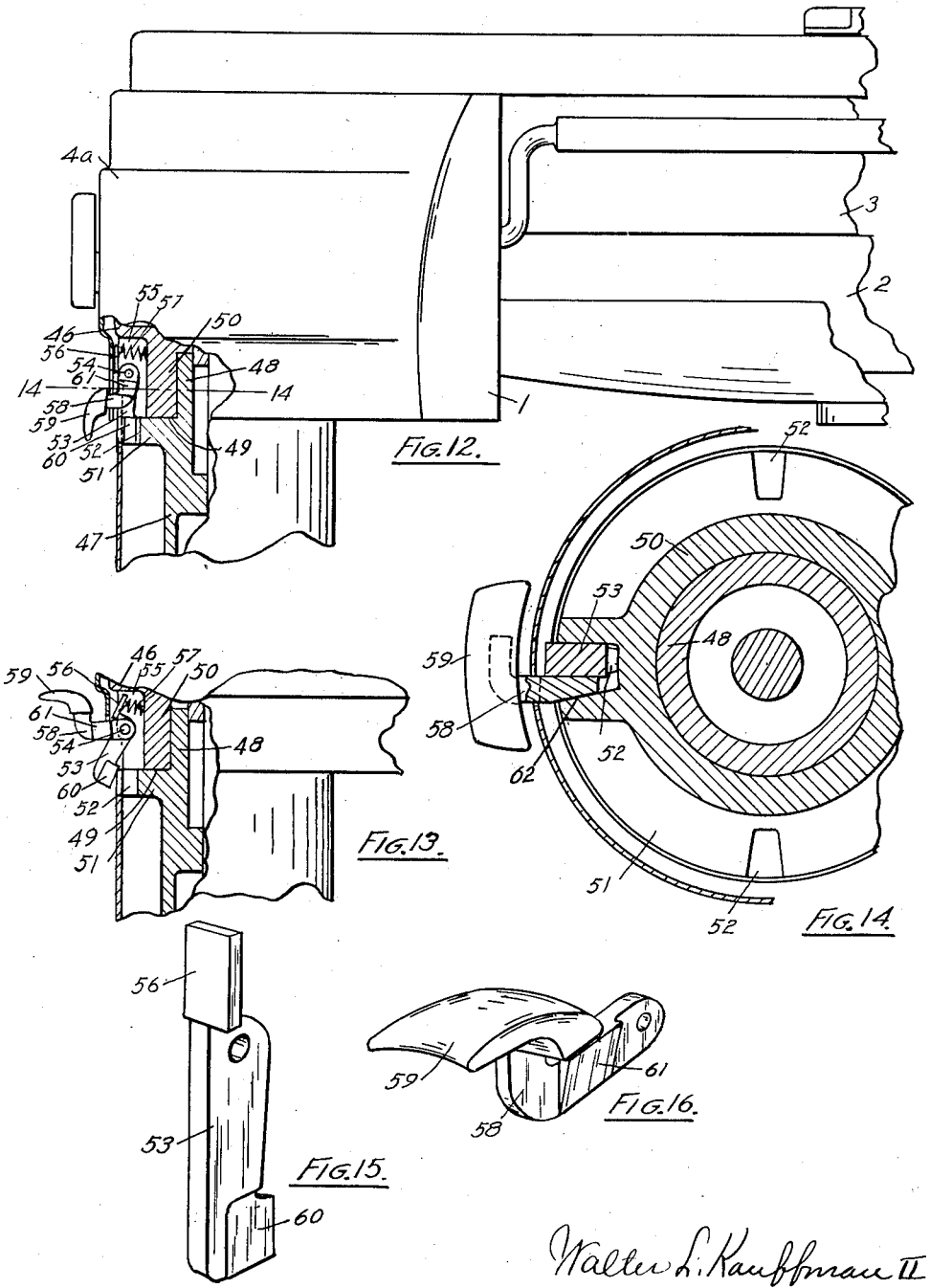

Patented May 25, 1943

2,320,325

UNITED STATES PATENT OFFICE 2,320,325

INDEXING DEVICE FOR WRINGERS

Walter L. Kauffman II, Erie, Pa., assignor to Lovell Manufacturing Company, Erie, Pa. a corporation of Pennsylvania Application March 24, 1941, Serial No. 384,841

8 Claims. (Cl. 68—274)

Power wringers are usually mounted so that they may be swung to different positions to facilitate their use. This is accomplished by swivelling the head on which the wringer is carried on the supporting post.

With the indexes as ordinarily made there is more or less play in the swivel joint carrying the wringer, and this is objectionable. The present invention is designed to provide an indexing device that will lock and rigidly maintain the wringer in the index position and at the same time is one that requires very little effort to operate. Features and details of the invention will appear from the specification and claims.

Preferred embodiments of the invention are illustrated in the accompanying drawings as follows:

Fig. 1 shows a front elevation of a wringer having an indexing device in accordance with the invention.

Fig. 2 a section on the line 2—2 in Fig. 1.

Fig. 3 a section on the line 3—3 in Fig. 2, showing the indexing device in set position.

Fig. 4 a similar view with the mechanism moved toward release position.

Fig. 5 a detached view of the indexing pin.

Fig. 6 a front elevation of an alternative construction.

Fig. 7 a section on the line 7—7 in Fig. 6, with the indexing device in set position.

Fig. 8 a similar view with the indexing device in position to be released.

Fig. 9 a similar view with the indexing device in release position.

Fig. 10 a view of the indexing pin.

Fig. 11 a detached view of the index wedge.

Fig. 12 a front elevation, partly in section, of a second modification.

Fig. 13 a view of the index in release position.

Fig. 14 a section on the line 14—14 in Fig. 12.

Fig. 15 a detached perspective view of the index locking arm.

Fig. 16 a detached view of the index actuating and wedging arm.

1 marks the wringer frame, 2 a lower roll, 3 an upper roll, 4 a head, 4a a case for the head, 5 a supporting post for the wringer. The supporting post has a swivel extension 6 with a shoulder 7 at the bottom of this extension. The head has a sleeve 8 with a shoulder at the upper end. The sleeve is swivelled on the extension and permits the swinging of the head and wringer on the post.

An index flange 10 is arranged on the post. It is provided with a series of tapered openings 12. The tapered openings are adapted to receive a tapered end 14 of an index pin 13. The index pin is slidingly mounted in an opening 15 in the head. It is urged toward set position by a spring 16 arranged against the upper end of the pin and the bottom of the socket.

The pin is operated by a projection 17 which extends from a forked lever 18. The lever is pivoted on ears 19 formed on the sleeve 8. The lever is provided with a handle 20, the handle operating through a slot 20a in the case. The index pin is provided with a notch 21, and the projection 17 is backed by a lug 22 on the sleeve 8. The projection is of wedge form and engages an inclined surface 23 at the bottom of the notch 21. The notch forms a shoulder 24 at its upper end which is engaged by the projection 17 when the lever its lifted and thus lifts the pin out of engagement with the index flange.

In the operation of the device, starting with the fixed position of Fig. 3, when the lever is lifted it backs up the pin 13 as the projection engages the shoulder 24. A continued movement of the lever lifts the tapered end 14 out of the socket or opening 12. The wringer then can be swung to the desired position and the lever released, thus permitting the pin, under the influence of the spring, to return to set position. The lever follows, carrying the wedge shaped projection 17 along the wedge face of the pin and as the wringer jars, this wedging action is increased. Therefore, with the tapered end of the pin operating in a tapered seat and a wedging of the pin in the socket, all play or lost motion is taken out of the indexing device. On the other hand, when it is desired to release the pin, the wedging action is first removed so that the pin is perfectly loose in the socket and then with a continued movement the pin is lifted and the indexing device released.

It is desirable not only to wedge the pin against movement, but to wedge it in a centered position. For that reason the socket or opening 15 is provided with inclined faces 25 which receive the round surfaces of the pin and center it as the pin is wedged against the angle surfaces.

In the alternative view shown in Figs. 6 to 11, the wringer is similar to that of Fig. 1. A head 26 carries the wringer. It is mounted on a post 27. The post has a swivel extension 28 forming a shoulder 29 at the bottom. The head has a sleeve 30 forming a swivel joint on the extension 28. An index flange 31 extends from the post.

It is provided with index openings 32, these openings being tapered. An index pin 33 is provided with a tapered end 34 which is adapted to enter and seat in the opening 32. The pin 33 is mounted in a socket 35. A spring 36 is arranged over the pin and tends to seat the pin in set position. The pin is provided with a notch 37 which has an inclined wedge face 38 at the back of the notch and a shoulder 39 at the upper end of the notch.

A wedge piece 40 conforming to the walls of the socket has a wedge face 41 engaging the wedge face 38. A handle pin 42 extends from the wedge piece through a slot 43 in the wall of the socket. A handle 44 is arranged on the outer end of the pin and operates through a case 45.

In operation, when the wedge piece is lifted, it engages the shoulder 39, as indicated in Fig. 8, and with a continued movement the index pin 33 is lifted out of the opening 34 and the wringer thus released and permitted to swing. When it is brought to the proper position, the wedge piece is released. The spring drives the index pin into set position and the wedge piece drops to wedging position, thus rigidly locking the connection.

In the alternative construction shown in Figs. 12 to 16, the wringer is of the same construction as shown in Fig. 1. It is provided with a head 46 mounted on a post 47. The post has a swivel extension 48 with a shoulder 49 at the bottom of the extension. The head has a sleeve 50 which is swivelled on the extension 48. An index flange 51 has index notches 52 adapted to receive a swinging index arm 53. The index arm is pivoted on a pin 54 arranged in a slot 55 in the sleeve 50. The arm has an extension 56 which is engaged by a spring 57 which tends to swing the lower end of the index arm into an index notch 52 for locking the wringer in set position.

An operating arm 58 is pivoted on the pin 54, the arm having a handle 59. The arm 53 is provided with a wedge shaped portion 60 adapted to engage a wall of the index notch 52. The operating arm 58 has a wedging surface 61 adapted to engage a wedge surface 62 on the wall of the notch 52. The wedge surfaces 61 and 62 exert a crowding action on the arm 53, locking it rigidly in the groove 52 and holding the wedge 60 firmly in the notch 52.

The operation of this alternative construction is as follows: With the parts in set position as in Fig. 12, the handle 59 is raised. This pulls the wedge portion 61 out of the slot and as the actuating arm swings upwardly, it engages the lower end of the extension 56, thus compelling the swinging of the index arm 53 with the actuating arm. This withdraws the index arm from the index notch and permits the swinging of the wringer.

After the wringer is turned to the desired position, the actuating handle is released. The spring 57 throws the index arm 53 into position and the actuating arm drops into position, carrying the wedge into wedging relation so as to lock the parts in rigid position.

What I claim as new is:

1. In an indexing device for wringers having a wringer frame member and a supporting member on which the frame member is swingingly mounted, the combination with said members of an indexing mechanism for locking the members in adjusted position comprising a locking device on one of the members and stationary with relation thereto, and a movable locking device mounted on the other member and movable with relation thereto into and out of engagement with the stationary device, and an actuating element for actuating the movable device and having lost motion relatively to said movable device; and means actuated by the actuating element for fixing the movable device against play, the take-up of the lost-motion in one direction easing the fixed relation for permitting a release movement of the movable device, and the take-up of the lost motion in the opposite direction fixing the movable device against play with one of the members following the setting movement of the movable device.

2. In an indexing device for wringers having a wringer frame member and a supporting member on which the frame member is swingingly mounted, the combination with said members of an indexing mechanism for locking the members in adjusted position comprising a locking device on one of the members and stationary with relation thereto, and a movable locking device mounted on the other member and movable with relation thereto into and out of engagement with the stationary device, and an actuating element for actuating the movable device and having lost motion relatively to said movable device; and means actuated by the actuating element for fixing the movable device against play, the take-up of the lost motion in one direction easing the fixed relation for permitting a release movement of the movable device, and the take-up of the lost motion in the opposite direction fixing the movable device against play with the member on which it is mounted following the setting movement of the movable device.

3. In an indexing device for wringers having a wringer frame member and a supporting member on which the frame member is swingingly mounted, the combination with said members of an indexing mechanism for locking the members in adjusted position comprising a locking device on one of the members and stationary with relation thereto, and a movable locking device mounted on the other member and movable with relation thereto into and out of engagement with the stationary device, and an actuating element for actuating the movable device and having lost motion relatively to said movable device; and means actuated by the actuating element for fixing the movable device against play, the take-up of the lost motion in one direction easing the fixed relation for permitting a release movement of the movable device, and the take-up of the lost motion in the opposite direction fixing the movable device against play with the member with which it locks following the setting movement of the movable device.

4. In an indexing device for wringers having a wringer frame member and a supporting member on which the frame member is swingingly mounted, the combination with said members of an indexing mechanism for locking the members in adjusted position comprising a locking device on one of the members and stationary with relation thereto, and a movable locking device mounted on the other member and movable with relation thereto into and out of engagement with the stationary device, one of the members having an opening in which the movable device moves, and an actuating element for actuating the movable device and having lost motion relatively to said movable device; and means actuated by the actuating element for fixing the movable device against play, the take-up of the lost motion in one direction easing the fixed relation for permitting a release movement of the movable device, and the take-up of the lost motion in the opposite direction fixing the movable device against play in the opening following the setting movement of the movable device.

5. In an indexing device for wringers having a wringer frame member and a supporting member on which the frame member is swingingly mounted, the combination with said members of an indexing mechanism for locking the members in adjusted position comprising a stationary locking device on one of the members and a movable locking device in the form of a pin mounted on the other member, one of the members having a socket in which the movable locking device is slidingly mounted, said pin having a notch with a wedging surface at the bottom of the notch and a shoulder at the end of the notch, and a wedge piece arranged in the socket and having a wedging surface engageable with the wedging surface of the pin to fix the pin against freedom of movement, the wedge piece being adapted to release the wedging engagement and to actuate the pin through engagement with the shoulder.

6. In an indexing device for wringers having a wringer frame member and a supporting member on which the frame member is swingingly mounted, the combination with said members of an indexing mechanism for locking the members in adjusted position comprising a locking device on one of the members and stationary with relation thereto, and a movable locking device mounted on the other member and movable with relation thereto into and out of engagement with the stationary device, said movable locking device comprising a swinging arm, an actuating element for actuating the movable device and having lost motion relatively to said movable device, and means actuated by the actuating element for fixing the movable device against play, the take-up of the lost motion in one direction easing the fixed relation for permitting a release movement of the movable device, and the take-up of the lost motion in the opposite direction fixing the movable device against play with one of the members following the setting movement of the movable device.

7. In an indexing device for wringers having a wringer frame member and a supporting member on which the frame member is swingingly mounted, the combination with said members of an indexing mechanism for locking the members in adjusted position comprising a locking device on one of the members and stationary with relation thereto, and a movable locking device mounted on the other member and movable with relation thereto into and out of engagement with the stationary device, and an actuating means for actuating the movable device and having lost motion relatively to said movable device; said actuating means comprising a wedge for fixing the movable device against play, the take-up of the lost motion in one direction easing the wedging action for permitting a release movement of the movable device and the take-up of the lost motion in the opposite direction fixing the movable device against play with one of the members following the setting movement of the movable device.

8. In an indexing device for wringers having a wringer frame member and a supporting member on which the frame member is swingingly mounted, the combination with said members of an indexing mechanism for locking the members in adjusted position comprising a locking device on one of the members having a locking opening and stationary with relation thereto, and a movable locking device mounted on the other member and movable with relation thereto into and out of engagement with the stationary device, and an actuating means for actuating the movable device and having lost motion relatively to said movable device; said actuating means comprising a wedge for fixing the movable device against play, the take-up of the lost motion in one direction easing the fixed relation for permitting a release movement of the movable device and the take-up of the lost motion in the opposite direction fixing the movable device against play with one of the members following the setting movement of the movable device.

WALTER L. KAUFFMAN, II.